United States Patent Office 3,796,694
Patented Mar. 12, 1974

3,796,694
PROCESS FOR THE PREPARATION OF CYCLIC ACID ANHYDRIDES
William J. Heilman, Allison Park, Pa., assignor to Gulf Research & Development Company, Pittsburgh, Pa.
No Drawing. Continuation-in-part of application Ser. No. 93,469, Nov. 27, 1970, now Patent No. 3,706,703, which is a continuation-in-part of application Ser. No. 828,001, May 26, 1969, now Patent No. 3,580,893, and which is a continuation-in-part of abandoned application Ser. No. 594,347, Oct. 25, 1966. This application Aug. 21, 1972, Ser. No. 282,169.
Int. Cl. C08f 27/12
U.S. Cl. 260—78.5 T     10 Claims

ABSTRACT OF THE DISCLOSURE

A process is defined for heating an organic compound prepared by the reaction of maleic anhydride and a vinyl ether and containing at least one half-ester of a dicarboxylic acid where the carbonyl groups are directly connected to adjacent internal aliphatic carbon atoms to a temperature of at least about 105° C. and preferably from about 105° C. to 149° C. to convert the half-ester groups to cyclic anhydride groups and a by-product alcohol. The organic compound is a 1:1 copolymer of a vinyl ether having at least three carbon atoms, such as methylvinylether, and maleic anhydride. If the organic compound contains both half-ester and diester groups, the resulting compound after heating to a temperature from 105° C. to 149° C. will contain anhydride and diester linkages.

---

This application is a continuation-in-part of my copending Ser. No. 93,469, filed Nov. 27, 1970, now U.S. Pat. 3,706,703 which was in turn a continuation-in-part of my Ser. No. 828,001, filed May 26, 1969, now U.S. Pat. 3,580,893, which was in turn a continuation-in-part of my Ser. No. 594,347, filed Oct. 25, 1966, now abandoned, all preceding serial numbers, being assigned to the same assignee as the present application.

This invention relates to a method for the preparation of cyclic acid anhydrides and more particularly to the preparation of high purity cyclic acid anhydrides from certain organic compounds containing the half-ester of a dicarboxylic acid.

The reaction of maleic anhydride with a vinyl ether to produce a copolymer is a known reaction. In some instances, the reaction does not go to completion, and the copolymer product remains contaminated with small amounts of unreacted maleic anhydride and/or unreacted vinyl ether. These small amounts of unreacted materials need to be removed since they may interfere in subsequent reactions involving the copolymers. Normally, the copolymer is freed of these impurities by mixing the copolymer in an alcohol, such as methanol, which dissolves the unreacted components. In other instances, the copolymer is soluble in the polymerization reaction medium and the copolymer solution is mixed with an aliphatic alcohol which not only serves to dissolve any unreacted monomers, but acts as a precipitating medium so that a solid copolymer product can be obtained free of unwanted monomers. An alcohol, however, will react with the anhydride groups of the copolymer to produce a half-ester in the following manner:

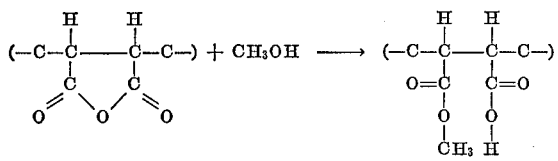

The reaction of the alcohol with the copolymer is a slow reaction, especially at room temperature, but the time required for the washing-precipitation procedure is such that some half-ester is inevitably formed. Thus, while the washing-precipitation procedure solves the problem of eliminating any unreacted monomers, it presents a second purification problem involving the conversion of the half-ester back to the anhydride.

It has now been found, quite unexpectedly, that certain half-ester compounds can be converted to cyclic acid anhydrides and a by-product alcohol by a simple heating at relatively low temperatures while removing the by-product alcohol as quickly as it is formed.

In accordance with the invention, a substantially pure cyclic acid anhydride is produced by a process which comprises:

heating a solid copolymer formed by the reaction of maleic anhydride with a vinyl ether as represented by the general formula:

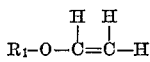

where $R_1$ is an aliphatic hydrocarbon radical having from 1 to 48 carbon atoms, said solid copolymer being at least partially randomly half-esterified with an alcohol having the formula ROH where R is a hydrocarbon radical having from 1 to 10 carbon atoms, at a temperature from at least about 105° C. to convert the half-ester portion of said copolymer to a cyclic anhydride group and a by-product alcohol corresponding to the formula ROH where R is as defined;

removing the by-product alcohol from contact with the solid copolymer substantially as quickly as it is formed;

and recovering a solid copolymer product substantially free of said half-ester groups.

The process of this invention is applicable to the conversion of a solid copolymer containing at least one divalent radical having the formula:

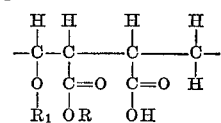

where R is a hydrocarbon radical having from one to ten, preferably from one to four, carbon atoms and $R_1$ is an aliphatic hydrocarbon radical having from one to 48, preferably from four to 18, carbon atoms. The term "hydrocarbon radical" is intended to substantially exclude olefinic unsaturation in the radicals unless otherwise indicated. The solid copolymer must therefore have at least eight carbon atoms, and at least four carbon atoms in a straight chain and the carbonyl groups of the acid and ester functions of the half-ester groups must be directly attached to adjacent internal aliphatic carbon atoms. By "internal carbon atoms" is meant carbon atoms which do not terminate the carbon chain in the solid copolymer. The process of the invention is not applicable to the treatment of organic compounds containing half-esters where the carbonyl groups of the acid and ester functions are directly attached to terminal carbon atoms, such as methyl hydrogen succinate, or to the treatment of organic compounds containing a half-ester of a dicarboxylic acid where the carbonyl groups of the acid and ester functions are directly attached to an aromatic ring, such as methyl phthalate, or to the random half-esters of ethylene-maleic anhydride copolymers.

The preferred charge stocks are those prepared by the copolymerization of maleic anhydride and a vinyl ether having from three of 50, preferably three to 20, carbon atoms per molecule and then at least partially randomly half-esterified with an alcohol having from one to ten, preferably one to four, carbon atoms. Thus, it is preferred in the process of this invention to heat a copolymer of maleic anhydride and a vinyl ether having from three to 50, preferably three to 20, carbon atoms wherein said copolymer is at least partially randomly half-esterified with an alcohol having from one to ten, preferably one to four, carbon atoms.

The maleic anhydride-vinyl ether copolymers have the formula:

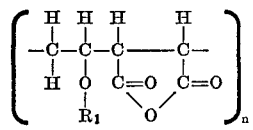

where $R_1$ is as defined and $n$ is an integer from 2 to 100, usually 5 to 20. These copolymers can then be reacted with an aliphatic monohydroxy alcohol having the formula ROH where R is an alkyl group having from one to ten carbon atoms to produce a copolymer having at least one half-ester group. The half-ester groups will usually be randomly distributed along the copolymer chain. All of the cyclic anhydride groups can be half-esterified or block sections of the copolymers can be half-esterified.

The charge stocks of this invention can be prepared in any suitable manner, and their method of preparation or source is not critical. Thus, suitable half-esters can be purchased and converted to the desired cyclic anhydride in high purity while obtaining as a by-product an alcohol, the alkyl portion of which corresponds to the alkyl portion of the half-ester.

The process of this invention is particularly applicable, however, to the purification of solid copolymers of vinyl ethers with maleic anhydride, which copolymers contain a plurality of internal cyclic anhydride groups and, as an impurity, small amounts of randomly distributed half-ester groupings. These copolymers are generally prepared by methods well known in the art.

One of the monomers is maleic anhydride, i.e.,

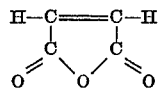

It is preferred that the maleic anhydride be substantially free of maleic acid. The maleic anhydride will, of course, react with water to form the undesired maleic acid. Commerical maleic anhydride is suitable for use in the process of this invention, but in the event it is exposed to water and thereby becomes contaminated with maleic acid, means should be employed to remove the maleic acid before the maleic anhydride is used in the subject process. One suitable method of purifying the maleic anhydride is to dissolve the maleic anhydride in a liquid, such as benzene, which is a solvent for the maleic anhydride but a non-solvent for the maleic acid. The acid can then be separated by filtration or otherwise and the maleic anhydride recovered by evaporation of the benzene.

The maleic anhydride monomer can be copolymerized with a vinyl ether as represented by the general formula:

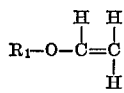

where $R_1$ is as defined above, i.e., an aliphatic hydrocarbon radical having from one to 48, preferably from one to four, carbon atoms.

It is understood the term "vinyl ether" is meant to include mixtures of vinyl ethers having from three to 50 carbon atoms per molecule. It is desirable that only one olefinic bond per molecule be present in the vinyl ether.

Examples of vinyl ethers suitable as co-monomers include:

methylvinylether;
ethylvinylether;
propylvinylether;
butylvinylether;
hexylvinylether;
octylvinylether;
decylvinylether; and
octadecylvinylether.

The copolymerization of a vinyl ether with maleic anhydride can be conducted in any suitable manner and such polymerization procdures are well known to those having ordinary skill in the art and form no part of this invention. One suitable copolymerization procedure involves contacting the vinyl ether with the maleic anhydride in a suitable solvent in the presence of a free-radical producing catalyst, such as a peroxide. Regardless of the method of preparation, the process of this invention is applicable to those copolymers which are randomly half-esterified.

The molecular weight of the copolymers used in the process of this invention can vary over a wide range. The specific viscosity (which is a measure of molecular weight) as determined on a solution of one gram of copolymer in 100 ml. of methylethylketone at 25° C. can suitably be between about 0.05 and 4.0 and is usually from 0.1 to 3.5.

Such undesired half-ester group impurities in the copolymers prepared as above may occur due to the nature of the recovery of the desired polyanhydride. For example, alcohols, especially methanol, ethanol, propanol and butanol, may be employed to dissolve unreacted monomers from the product. As a result of the preparation procedures, some of the anhydride groups in the polyanhydrides are converted to the half-ester form even though low temperatures and other precautions are taken to avoid half-ester formation.

The copolymer can easily be converted to a substantially pure polyanhydride by heating the polyanhydride containing small amounts of half-ester at a temperature from at least about 105° C., preferably 105° C. to 149° C., while continuously removing the alcohol as formed until an amount of alcohol has been recovered corresponding to the amount of half-ester groups in the copolymer.

It is very difficult to measure accurately the quantitative amounts of half-ester present in the solid copolymers treated by the method of this invention especially as the amount of half-ester in the substantially pure products is reduced to a very small amount. It is possible to subject the samples to infrared analysis wherein certain peak heights generated at certain wavelengths are indicative of the presence of anhydride or ester functions. The peaks generated are believed to represent carbonyl group stretching vibrations, and such vibrations differ for the carbonyl groups associated with the anhydride and ester functions. For a more complete explanation, reference is made to "Spectrometric Identification of Organic Compounds" by Silverstein and Bassler, published by John Wiley and Sons, Inc.

One suitable measure of the amount of ester present in the copolymers of this invention is a measure of the numerical ratio of the peak heights generated by infrared at 1725 cm.$^{-1}$ and 1780 cm.$^{-1}$, respectively. The peak height at 1725 cm.$^{-1}$ is defined in this specification as the ester peak. The peak height at 1780 cm.$^{-1}$ is defined in this specification as the anhydride peak. It is further specified that the infrared analysis be performed on a solution of the copolymers in tetrahydrofuran as the type of solvent may shift the ester or anhydride peak. It is well recognized by those having ordinary skill in the art that the concentration of the material being analyzed in the solvent is also important to obtain reproducible results. A suitable concentration of sample in the methanol is from 5 to 25 weight percent, usually about 5 to 10 weight percent. The infrared spectra are recorded on absorbance versus wave number charts.

A "substantially pure cyclic acid anhydride" is defined in this application as one having an E/A (ester to anhydride) numerical peak height ratio of less than 0.25. Usually the cyclic acid anhydride products produced by the method of this invention have E/A ratios of from 0.05 to 0.20. Normally, the materials to be purified contain small proportions of half-ester groupings, although cyclic acid anhydrides which are substantially completely half-esterified can also be treated in accordance with the method of this invention. Thus the pure cyclic acid anhydrides normally have E/A peak height ratios of greater than 0.25, for example, from 0.3 to 7 or more; but usually the E/A peak height ratios are from 0.3 to 3.0.

The method of this invention is particularly applicable as a method of purifying a vinyl ether-maleic anhydride copolymer containing a small percentage of the anhydride groups as randomly distributed half-ester groups, that is, copolymers having E/A peak height ratios from 0.3 to 3.0.

It has now been found that the half-ester containing solid copolymers defined above can be converted to a cyclic acid anhydride and an alcohol corresponding to the alcohol portion of the ester by simply heating the defined half-ester containing compounds while in the liquid or solid phase at a relatively mild temperature of about 105° C. to 149° C., and usually from 110° C. to 130° C. Higher temperatures, up to about 200° C., can be employed, if desired.

The reaction is believed to proceed according to the general equation:

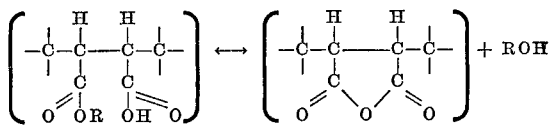

where R is as defined above. It is to be noted that the alkyl portion (R) of the alcohol which is produced is the same as the alkyl portion of the carboalkoxy (—COOR) function of the half-ester organic compound. The above reaction is reversible under the conditions of this invention, and it is necessary to remove the alcohol from the reaction zone, preferably substantially as quickly as it is formed, in order to obtain cyclic anhydrides wherein less than five mole percent of the carbonyl content is present in mono-ester groupings. While the alcohols can be removed in any suitable manner, such as by complexing with inorganic drying agents, it is preferred that the alcohols be removed by distillation. Hence, the process of this invention is particularly applicable to the conversion of half-ester organic compounds as defined above where the alkyl portion of the carboalkoxy function (the alcohol portion of the half-ester) forms an alcohol which can be continuously removed by distillation from the reaction zone as it is formed. Hence, the alcohol which is formed should preferably have a boiling point of between 50° C. and 190° C. at a reaction pressure of one atmosphere or less. It is preferred to heat the half-ester solid copolymer under a pressure less than atmospheric, preferably between one and 20 mm. Hg, so that the alcohol which is formed can easily be removed under vacuum. This method is ideally suited to the purification of the maleic anhydride-vinyl ether copolymers, which copolymers have at least 12 carbon atoms and which copolymers contain minor amounts of the half-ester (between 0.5 and 20 mole percent of the total carbonyl content present in the ester portion of the half-ester), and wherein the alkyl portion of the carboalkoxy function has between one and ten carbon atoms, since the copolymer is easily maintained in the liquid or solid phase under reduced pressure while the alcohol is easily vaporized and continuously removed. In the event a vacuum operation is not suitable, a purge gas consisting of $N_2$ or other inert gas can be continuously passed through the reaction zone at the appropriate temperature to remove the alcohol which is formed.

The reaction temperature can therefore, as noted, suitably be from at least about 105° C. and is preferably from about 105° C. to 149° C., with more preferred reaction temperatures being from 115° C. to 140° C., and the most preferred temperatures being from 120° C. to 140° C. Temperatures below 105° C. are not as suitable, as the reaction rate to the production of the desired cyclic anhydride is too slow. Higher temperatures up to about 200° C. can be used, if desired, but such higher temperatures are not required.

The reaction time will depend on the temperature employed. Times from one to 200 hours or more can be employed, although the time is generally between one and 24 hours.

The invention will be further described with reference to the following experimental work.

Three different methylvinylether-maleic anhydride solid copolymers having increasing molecular weights were obtained commercially (from the General Aniline & Film Co.) and were designated AN–119, AN–139 and AN–169, respectively. The specific viscosity ranges of the samples were 0.1 to 0.5 (AN–119); 1.0 to 1.4 (AN–139); and 2.6 to 3.5 (AN–169).

Portions of the methylvinylether-maleic anhydride copolymer samples, as received, were dissolved in tetrahydrofuran in a concentration of one gram of copolymer per 10 grams of tetrahydrofuran. Infrared analysis of all three samples in solution was made, and the E/A peak height ratios were determined as 0.96 (AN–119); 0.3 (AN–139); and 0.47 (AN–169).

A series of runs was made in which 10-gram samples of each of the copolymers was added to 150 grams of methanol and the mixture heated to reflux to dissolve the copolymers. Dissolution time increased with the molecular weight (specific viscosity) of the sample.

Refluxing of the samples was continued after solution to effect esterification, and infrared analysis of aliquot portions of the reaction solution were made after 2 and 20 hours.

The product ester was precipitated by pouring the product solution into 300 ml. of 1,2-dichloroethane. The solids were separated and placed onto a glass petri dish which was placed in a Variac oven at 30 inches of mercury and 50° C. overnight. Infrared analysis after 24 hours was made on a nine weight percent solution of the product in tetrahydrofuran.

Portions of the product from drying at 50° C. overnight were further treated by being held in a vacuum oven at 30 inches of mercury for (1) three days at 100° C.; (2) 64 hours at 125° C.; and (3) 24 hours at 150° C. Infrared analysis was made on a nine weight percent solution of the various products in tetrahydrofuran.

The E/A numerical peak height ratios for the various samples and products are given in Table I below:

TABLE I

| Ex No. | Description | E/A numerical peak height ratio Sample number | | |
|---|---|---|---|---|
| | | A[1] | B[2] | C[3] |
| 1 | Initial | 0.96 | 0.31 | 0.47 |
| 2 | Esterification for 2 hrs | 3.00 | 2.14 | 2.92 |
| 3 | Esterification for 20 hrs | 6.80 | 4.29 | 7.40 |
| 4 | Vacuum drying at 50° C | 5.89 | 5.44 | 7.30 |
| 5 | Vacuum drying at 100° C | 0.41 | 0.58 | 0.87 |
| 6 | Vacuum drying at 125° C | 0.20 | | |
| 7 | Vacuum drying at 150° C | 0.06 | 0.12 | 0.09 |
| 8 | As received and vacuum dry at 125° C | 0.11 | | |
| 9 | As received and vacuum dry at 150° C | 0.07 | 0.06 | 0.06 |

[1] Sample number A=AN–119.
[2] Sample number B=AN–139.
[3] Sample number C=AN–169.

Referring to Table I, it can be seen that the initial, esterified and vacuum dried products at 50° C. and 100° C. have E/A ratios above the desired level of 0.25. The products dried at 125° C. and 150° C. (Examples 6 and 7) have much lower ester contents as shown by the E/A ratios below 0.25.

That treatment in accordance with this invention is effective in the production of substantially pure cyclic anhydrides is further shown by Examples 8 and 9 in Table I above where the as received copolymer samples having the indicated E/A ratios (Example 1) were heated in a vacuum oven at 30 inches of mercury for 64 hours at 125° C. and 24 hours at 150° C. respectively, and the resulting products had very low E/A ratios.

EXAMPLE 10

In the run for this example, 36.3 grams of methyl hydrogen succinate were heated at a temperature of 65° C. in a vacuum oven (less than 1 mm. of Hg) for 24 hours and no anhydride was formed.

EXAMPLE 11

The product from Example 10 was further heated at 84° C. for 24 hours and then at 100° C. for 24 hours and no anhydride was recovered.

EXAMPLE 12

The product from Example 11 was further heated at 150° C. for 24 hours and the only product was a trace of charred material.

EXAMPLE 13

An ethylene-maleic anhydride copolymer (126 grams) purchased from Monsanto Chemical Company was reacted with 271 grams of n-butanol at 117° C. for four hours to produce some butyl half-ester of the ethylene-maleic anhydride copolymer. Analysis of the esterified copolymer by infrared indicated all of the anhydride groups had reacted. Ester peaks were, of course, formed and could also be observed by the infrared analysis. 100 ml. of the esterified reaction product solution were poured into 300 ml. of n-hexane and an oily product separated. This oily product was really the partially esterified copolymer dissolved in n-butanol. The oily product was washed with three separate 300 ml. portions of n-hexane to remove more of the n-butanol, and the resulting product was a soft white rubbery-like material. When this final product was heated in a vacuum oven for 18 hours at 120° C., a brittle transparent amber-like solid was crosslinked.

The brittle solid was insoluble in acetone, indicating the solid was crosslinked.

A comparison of Examples 6 and 13 shows that a half-ester of ethylene-maleic anhydride copolymers (Example 13) will not function in accordance with the teachings of this invention to reform the alcohol and the cyclic acid anhydride at temperatures greater than 105° C. while removing the alcohol as formed, whereas half-esters of the vinylether-maleic anhydrides copolymers will (Example 6).

EXAMPLE 14

100 ml. of the esterified reaction product solution described above was poured into 300 ml. of water at room temperature and a gummy solid similar to the final washed product of Example 7 was obtained.

This rubbery-like solid was heated in a vacuum oven at 50° C. for 18 hours and the resulting product was a brittle transparent amber-like solid. The solid was washed and heated for an added 20 hours in a vacuum oven at 50° C. as it had a slight odor of n-butanol.

The final heated solid was found to be soluble in acetone, indicating the half-ester did not decompose and no crosslinking occurred.

Resort may be had to such variations and modifications as fall within the spirit of the invention and the scope of the appended claims.

I claim:
1. A process for the preparation of a substantially pure cyclic acid anhydride which comprises:
heating a solid copolymer formed by the reaction of maleic anhydride with an olefinic compound as represented by the general formula:

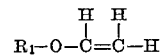

where $R_1$ is an aliphatic hydrocarbon radical having from 1 to 48 carbon atoms, said solid copolymer being at least partially randomly half-esterified with an alcohol having the formula ROH where R is a hydrocarbon radical having from 1 to 10 carbon atoms, at a temperature from 105° C. to 149° C. to convert the half-ester portion of said copolymer to a cyclic anhydride group and a by-product alcohol corresponding to the formula ROH where R is as defined;
removing the by-product alcohol from contact with the solid copolymer substantially as quickly as it is formed;
and recovering a solid copolymer product substantially free of said half-ester groups.

2. A process according to claim 1 wherein $R_1$ has from three to six carbon atoms and R has from one to four carbon atoms.

3. A process according to claim 2 wherein $R_1$ is an aliphatic straight-chain hydrocarbon radical.

4. A process according to claim 3 wherein the solid copolymer compound is heated to a temperature from 115° C. to 140° C. at subatmospheric pressure.

5. A process which comprises:
copolymerizing maleic anhydride with an olefinically unsaturated monomer having the formula:

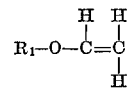

where $R_1$ is an aliphatic hydrocarbon radical having from 1 to 48 carbon atoms in the presence of a free-radical catalyst;
contacting said solid copolymer with an excess of a liquid monohydroxy alcohol having between 1 and 10 carbon atoms for a time sufficient to dissolve any unreacted monomers and convert at least a portion of the acid anhydride groups to half-ester groups;
separating said copolymer from said alcohol;
heating said copolymer at a temperature from about 105° C. to 149° C. while continuously removing any alcohol as it is formed; and
recovering a copolymer substantially free of said half-ester groups.

6. A process according to claim 5 wherein said olefinically unsaturated monomer has the formula:

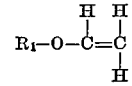

where $R_1$ is an aliphatic hydrocarbon radical having from 1 to 4 carbon atoms.

7. A process according to claim 6 wherein the vinyl ether is methylvinylether.

8. A method of purifying an aliphatic vinyl ether-maleic anhydride copolymer containing a small percentage of half-ester groups which comprises heating said copolymer at a temperature from about 105° C. to 149° C. to convert said half-ester groups to cyclic anhydride groups and an alcohol corresponding to the alcohol portion of the half-ester, removing said alcohol from contact with said copolymer substantially as quickly as said alcohol is formed, and recovering a copolymer substantially free of half-ester groups.

9. A process which comprises:
copolymerizing maleic anhydride and a vinyl ether having the formula:

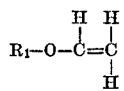

wherein $R_1$ is an aliphatic hydrocarbon radical having from 1 to 48 carbon atoms in the presence of a free-radical catalyst;
contacting said copolymer with an excess of a liquid monohydroxy non-aromatic alcohol having between 1 and 10 carbon atoms under esterification conditions including a temperature wherein water can be removed;
continuing the contacting for a time sufficient to convert at least a portion of acid anhydride groups to half-ester groups, while removing water as formed equivalent to converting between 20 and 80 weight percent of the carbonyl groups in the copolymer to diester groups;
thereafter heating said copolymer at a temperature from about 105° C. to 149° C. while continuously removing any alcohol as formed; and
recovering a copolymer substantially free of half-ester groups.

10. A process according to claim 1 wherein the solid copolymer is a 1:1 copolymer of maleic anhydride with said olefinic compound.

References Cited

UNITED STATES PATENTS

| | | | |
|---|---|---|---|
| 3,548,484 | 7/1969 | Zimmerman et al. | 260—78.5 |
| 2,997,464 | 8/1961 | Sellers | 260—78.5 |
| 2,977,334 | 3/1961 | Zopf et al. | 260—27 |
| 3,706,703 | 12/1972 | Heilman | 260—78.5 T |

JOSEPH L. SCHOFER, Primary Examiner

J. KNIGHT, Assistant Examiner

U.S. Cl. X.R.

260—78.5 R

UNITED STATES PATENT OFFICE
CERTIFICATE OF CORRECTION

Patent No. 3,796,694     Dated March 12, 1974

Inventor(s) William J. Heilman

It is certified that error appears in the above-identified patent and that said Letters Patent are hereby corrected as shown below:

On the cover sheet insert -- The portion of the term of this patent subsequent to Dec. 19, 1989, has been disclaimed. --.

Signed and sealed this 31st day of December 1974.

(SEAL)
Attest:

McCOY M. GIBSON JR.
Attesting Officer

C. MARSHALL DANN
Commissioner of Patents